Patented July 6, 1943

2,323,466

UNITED STATES PATENT OFFICE 2,323,466

SEASONING COMPOSITION AND CARRIER

Carroll L. Griffith, Chicago, Ill., assignor to The Griffith Laboratories, Inc., Chicago, Ill., a corporation of Illinois No Drawing. Application December 22, 1939, Serial No. 310,585

7 Claims. (Cl. 99—140)

The present invention relates to seasoning compositions for food products, especially meat products.

Heretofore, spice oils and oleoresins, and mixtures of them, particularly mixtures of spice oils and oleoresin of capsicum or red peppers, have been supplied as a powdery composition, by associating them with a powdered edible carrier material. Various carriers known heretofore are sugar, salt, starches, cereals, gelatinized flours, powdered milk, and others. Numerous variations from simple mixtures are known, primarily aimed at increasing the stability of the compounded masses. Stability against evaporation is one objective. Stability as to color is another, this being directed more particularly to the color resulting from the use of oleoresin of red peppers. For stability against evaporation, fixative materials, such as oils and fats have been employed.

The compounding and use of solid seasoning compositions is somewhat dependent upon government regulations, which in general limit the addition to compounded meat products, of non-animal matter. The compounding of seasoning materials is somewhat affected by the desire to increase the proportion of flavoring material to carrier, and to limit the addition of non-animal carrier, which dilutes the animal protein of the meat product.

The present invention aims to overcome the objections stated above and others, and to produce improved solid seasoning compositions.

One object of the invention is to provide a base or carrier for solid seasoning compositions which is an animal product.

Another object is to provide an animal-body protein as a base or carrier for seasoning compositions.

Still another object is to provide a solid carrier for seasoning compositions which is of animal origin, and which may retain a small amount of naturally associated animal fat.

Still another object of the invention is to provide a base or carrier which is of animal origin and which is open and porous to provide a highly absorptive base for spice oils and oleoresinous extracts.

Various other and ancillary objects and advantages of the invention will appear from the following description and explanation of the invention.

In making seasoning compositions the primary objectives of stability as to flavoring content of volatile material, and as to flavor, aroma, bite and color, as these are present from the oils or oleoresinous material used, are attained in whole or in part, largely by the choice of carrier and other modifying agents. By the present invention an animal base carrier is provided which is edible, tasty, easily comminuted, highly absorptive, proteinaceous, and permissibly slightly fatty. It thus provides an ideal carrier for seasoning compositions. It not only holds and stabilizes the compound before its use, but it provides an ingredient for a meat product formula which is not a diluent of animal protein, but an addition thereto.

In the production of isolated animal fat, particularly hog fat or lard, the fatty tissues of the carcass are rendered by applying heat to melt the fat, and to dry water out of the tissue, whereby the fat collects as an isolated melted fat, and the solid non-fatty portions of the tissue remain, with absorbed and adherent melted fat. This solid residue is then gathered and compressed while hot, to squeeze from it a quantity of the fat held thereby. The solid product resulting from rendering is called "cracklings," and the term is most commonly applied to the product resulting from the production of lard. However, for the purposes of the present invention the solid residue may be derived from beef or other animals, and it is not necessarily and only from hogs. The term "cracklings" as used herein refers broadly to the residual solid material whether from hogs or other animals. It is primarily animal protein which in nature is associated with animal fat.

The cracklings discharged from the press as above described contain a considerable residue of fat. The material is in cake form and flaky because of the compression to which it has been subjected to express residual fat. However, for the purposes of the present invention the material need not be so compressed or flaky, nor be freed from that amount of fat which may conveniently be expressed. The material before expression of fat differs from the cake after expression, only in form and in fat content. The term "cracklings" applies to the material both before and after expressing fat. The substance is akin to the crisp residue from frying salt pork or bacon except that the cracklings are whiter and less altered because of not having been browned by higher heat. The cracklings have a pleasing taste due to the action of heat on the protein in rendering the fat.

In carrying out the invention the cracklings may contain up to 8% or 9% of fat, even after the mechanical expression of the fat. This content of fat makes the cracklings unsuitable as a carrier, particularly for the reason that the fat is subject to becoming rancid. The high fat content also makes it difficult to reduce the material to a powder form preferred as the carrier for seasoning oils and oleoresins. Also, the fat fills the pores of the solid material so that the same is not highly absorptive or porous.

According to the present process the cracklings are subjected to the action of a volatile fat solvent to extract fat from the cracklings. This lessens the tendency to rancidification, and when all the fat is removed the tendency to rancidity is also removed. Also, the removal of fat leaves pores and channels in the residual protein which are valuable depositories for the seasoning ingredients. Because the tissue remaining has been associated with fat, it is by nature adapted to hold other fat or oily substances such as are found in seasoning compounds. Any remnant of fat left in the tissue acts as a natural fixative so that the carrier may be both vehicular and fixative, thus combining the function of two ingredients of prior art compounds, that is: the carrier such as sugar, and fixative oil such as corn oil. Also the extraction of fat leaves a residue capable of being easily reduced to a granular powder form.

It is thus apparent that the tissue taken directly from rendering the fat, before or after mechanical expression of fat, may be subjected to the solvent extraction of fat. The extent to which fat is extracted to provide a carrier is determined largely by the amount which may be permitted to remain with unobjectionable rancidity. This depends upon the conditions of use. As a general statement, a fat content above 3% induces racidity. The residue loses its ability to be easily comminuted by grinding when it exceeds 3% of fat, and this is therefore deemed to be the upper limit of residual fat content for the invention. However, it is preferable to go below this limit to minimize rancidity. At 1½% fat content the carrier may be safely used for general purposes without any objectionable rancidity. Any residual fat will act as a fixative. In removing all of the fat, the resulting carrier is made more absorptive and porous in compensation for the loss of the fixative characteristic. It is therefore advantageous to remove all the fat. But in practice there are economic limitations that make 0% to ½% a commercial range to be aimed at. This practically avoids rancidity, and gives a highly porous and absorptive carrier in which the fixative power of the fat is not at all needed.

In illustration of the invention as it may be carried out commercially, hog cracklings from back fat, pork trimmings, caul, and ruffle fat are treated to express fat, giving a crackling cake of 8% to 9% fat. 4,000 lbs. of such cake is broken up and subjected to extraction with acetone as a solvent, used in amount according to the apparatus employed. Other solvents are ethyl ether, ethylene dichloride, trichlorethylene, and refined saturated hydrocarbons with sweet odor such as "Skelly Solvent D" boiling range 190°–220° F., made by Skelly Oil Company.

After volatilizing residual solvent from the solid residue, the cake analysis is as follows:

| | Per cent |
|---|---|
| Moisture | 4.49 |
| Fat | .22 |
| Protein (nitrogen×6.25) | 95.00 |
| Total | 99.71 |

The protein residue is then easily ground in a mill to any desired fineness, such as from 40 to 80 mesh.

The protein carrier of this invention may be used with various mixtures of flavoring ingredients, the nature of the mixture varying for different products to be seasoned. The ingredients are simply mixed mechanically, or the carrier is originally ground in the presence of other ingredients. Where one or more of the ingredients is added as a solution in a solvent to be evaporated from the ultimate composition, the residual solvent from the extraction may be left with the carrier for such final evaporation. The following are illustrative examples:

*Example 1 (for bologna)*

| | Parts by weight |
|---|---|
| Protein carrier | 96.4 |
| Essential oils | 2.1 |
| Oleoresin of capsicum | 1.5 |

*Example 2 (for pork sausage)*

| | Parts by weight |
|---|---|
| Protein carrier | 97.2 |
| Essential oils | 1.5 |
| Oleoresin of capsicum | 1.3 |

The oleoresin of capsicum above referred to and as commercially known, is commonly the solid residue from evaporating the solvent content of the extract obtained by treating red peppers with acetone. It is quite acid, and in seasoning compounds, the acidity is one cause of instability, and particularly of loss of color when sodium chloride is present in the base. In the present invention the protein carrier so holds the oleoresin within it and apart from any salt used in the compound, that the bleaching is greatly minimized. It is also to be understood that other and more stable extracts of red peppers may be used in place of the said oleoresin of capsicum, such as the non-acid oleoresin concentrate of red peppers produced by the process described in my joint application with Hall, Serial No. 306,410, filed November 27, 1939.

Said application also describes the mixing of a carrier with a non-acid or alkaline solution of red pepper ingredients in acetone or like solvent, to which a neutralizing agent, such as triethanolamine, is added before or after the extraction. The protein carrier of this invention may advantageously be used in that process by eliminating the removal of residual fat solvent in the preparation of the protein carrier. Thus, for example, where the fat of cracklings is extracted with a volatile solvent, the protein residue still carrying the solvent, may be mixed, with or without essential oils and other ingredients, with the non-acid or alkaline solution of red pepper extractives in the volatile organic solvent by which they were extracted from red peppers. Then the latter solvent, plus the residual solvent in the protein carrier may be eliminated together by evaporation or heating, preferably in a vacuum. This is a very effective way of carrying the more viscous ingredients of the formula, such as the solvent-free red pepper extractives, into the pores of the protein carrier. Where some fat is left in the protein carrier, this procedure distributes it homogeneously with the oils and other soluble extractives so that the fixative function of the fat is most efficiently used.

The product is distinctive in its odor, its permanence of color, and its ability to age. For example, identical formulations of a seasoning having oleoresin of capsicum and essential oils, differing only in the carrier, may be compared as to strength of odor, taste and bite. Where salt, sugar, flour and/or milk powder are used as the carriers, the odor of the seasoning after a period of, say 24 hours, is very sharply differentiated between the protein carrier and the other carriers. The protein carrier has relatively little aroma whereas the aroma of spice oils on the other carriers is very distinct. This indicates, of course, that the protein base is holding the aroma and flavor of the spice oils, whereas the other types of carrier are releasing them. After a period of 30, 60 or 90 days, the difference in the aroma factor largely disappears, due to the volatilization on the prior art type of carriers, even when fixed oil fixatives are used. If taste tests are made the protein carrier is found to contain the same flavors and practically the same bite as when first made, whereas the flavor and bite as determined by taste on the prior art carriers is to a substantial extent dissipated.

The color retention may be exhibited by exposing closed 4 ounce glass bottles of identical compounds except for the carriers, sugar, salt and animal-body protein, to the sun, as through a glass window. On sugar and salt, the color bleaches to almost white on the exposed side of the bottle. This indicates bleaching on the sugar and the salt carriers. However, on the new protein carrier in a month, the composition holds a large amount of its color at the exposed face of the bottle. This indicates greater stability, less exposure, and hence greater absorption.

Among the meat products commonly seasoned with solid seasoning compounds, such as sausages, frankfurters, bologna, meat loaf, and the like, the use of pork meat predominates. In rendering animal body fat in packing houses, the use of hog fat predominates in making lard. The cracklings from hog fat are thus available in large quantity. For these reasons protein carrier from hog body fat is the most economic for use and it is preferred. When used in a meat product containing pork meat the seasoning compound on a carrier wholly of hog-body protein introduces no sugar, salt or cereal requiring altering formulas, and it adds a material in refined form which is merely a normal ingredient from the use of pork.

The high capacity of the refined animal body-fat protein, compared to salt, sugar, cereals and the like, to hold spice oils and oleoresins, makes it permissible to compound solid seasonings having a higher flavoring content than is customary.

Heretofore, such commercially acceptable solid seasonings have carried up to about 5% of seasoning ingredients. The protein carrier of this invention may be loaded with ingredients way beyond this limit and up to the point where the flavoring ingredients are 10% to 15% of the composition. However, the flavoring content may be more than this, and even though there is loss, the residual amount of flavoring ingredients which is more resistant to escape from the carrier, provides a residue which is nevertheless a strong seasoning compound. Using a greater content of the protein carrier in a meat product formula than other-base seasonings of the prior art, is more readily permitted because the protein carrier is a normal constituent of meat products. Hence, the permanency of compositions on the new carrier may be made greater than in those compositions which are relatively high in flavoring ingredients in order to reduce the carrier as a diluent of the meat in the composition being flavored. It follows, therefore, that the invention provides a carrier which may be mixed with prior art carriers.

The invention is of course not limited to using a carrier which is 100% animal-body protein. It may be diluted with other carriers well known to the art. Where it is so diluted, the composition is practically a mixture of the new composition with an old composition, and the old one is improved in proportion as the total carrier is the animal-body-fat protein.

In the commercial manufacture of lard some care is exercised to trim lean from the pieces of fat which are rendered, but traces of lean do enter and remain in the cracklings. This is dehydrated in the process of rendering. In extracting residual fat from the cracklings, fat in the lean is also extracted. The resulting protein of cracklings then has also a small quantity of animal flesh protein, but is largely animal-body-fat protein in commercial cracklings. The latter protein is far more porous and absorptive for the purposes of the present invention than the protein from the lean, because in nature the protein of lean is less distended and more free from immediate association with fat.

For the use of cracklings for the present invention, more than the commercial content of lean may be included in the material to be rendered. However, increase in the lean gives darker color to the resulting mixed animal-body protein because of residual blood ingredients which remain in the flesh. For a light colored seasoning it is therefore desirable to minimize the lean, and as a result a more absorptive carrier is also produced.

But within the broader purposes of the invention, to eliminate from solid seasoning compositions a carrier ingredient of non-animal origin, it is contemplated that protein of animal flesh may be prepared by similar or suitable procedure. Animal lean may be macerated and washed with water, or water containing sodium citrate or other anti-coagulating agents to remove residual blood. Washing may also be omitted if a dark color is permissible. The lean, washed or not, is then dehydrated, and then subjected to extraction of fat, as with acetone, to minimize any tendency to rancidify. As with the cracklings, a small amount of fat may be retained. The flesh-protein may then be used as a carrier, alone or mixed with extracted cracklings, as described above with reference to cracklings.

Where the protein of flesh is too dark, it may be bleached with agents such as hydrogen peroxide, benzoyl peroxide, hypohalite salts and the like.

Where it is desired to retain the color resulting from residual blood in the flesh, the color may be improved by using curing salts, especially the nitrites or nitrous oxide, with or without sugars, such as corn sugar, to produce the brighter red colorings of nitroso-hemoglobin in one or more of its various known forms. Thus, the flesh may be cured by the regular methods used for any meat stock to brighten color. Then it may be dehydrated, defatted, and used for the seasoning base.

Seasoning compositions made predominantly on animal-flesh-protein carrier lack many of the valuable properties above described which are derived from the porosity of the animal-fat-protein, and from the natural affinity of the latter for hydrophobic materials, such as animal fat and spice extracts. However, the valuable advantages dependent upon the animal and proteinaceous character of the carrier, are obtained whether the carrier is derived from fat or flesh.

The invention is not to be considered as limited to and by the exemplary embodiments herein disclosed, and it is to be understood that numerous changes and departures are contemplated as falling within the scope of the invention as expressed in the appended claims.

I claim:

1. The method of making a solid seasoning composition which comprises extracting fat from animal body protein with a volatile organic solvent to provide a protein mass having not more than 3% of animal fat and capable of being finely divided to form a powder when free from volatile organic solvent and to form a porous protein body, mixing said protein while wet with residual fat-extracting solvent with a solution of a flavoring spice-ingredient in a volatile solvent, and evaporating volatile solvent from the mixture to provide a solid pulverizable mass comprising said protein as a carrier impregnated with the said flavoring spice ingredient.

2. The method of making a solid seasoning composition which comprises incompletely extracting fat from animal body protein with a volatile organic solvent to provide a porous protein body and to provide a protein mass containing a residue of not over 3% of animal fat in the body protein, which residue of fat and protein is capable of being finely divided to form a powder when free from volatile organic solvent, mixing said fat-containing protein while wet with residual fat-extracting solvent with a solution of a flavoring spice-ingredient in a volatile solvent, and evaporating volatile solvent from the mixture to produce a solid pulverizable mass comprising said protein as a carrier impregnated with a mixture of said fat and said flavoring ingredient.

3. The method of making a solid seasoning composition which comprises extracting fat from cracklings with a volatile organic solvent to provide a portein mass having not over 3% of residual animal fat and capable of being finely divided to form a powder when free from volatile organic solvent and to form a porous protein body, mixing said protein while wet with residual fat-extracting solvent with a solution of a flavoring spice-ingredient in a volatile solvent, and evaporating volatile solvent from the mixture to produce a solid pulverizable mass comprising said protein as a carrier impregnated with the said flavoring spice ingredient.

4. The method of making a solid seasoning composition which comprises extracting fat from cracklings with a volatile organic solvent to provide a protein mass containing a residue of fat from the cracklings, which residue is capable of being finely divided to form a powder when free from volatile organic solvent, mixing said fat-containing protein while wet with residual fat-extracting solvent with a solution of a flavoring spice-ingredient in a volatile solvent, and evaporating volatile solvent from the mixture to produce a solid pulverizable mass comprising said protein as a carrier impregnated with the said flavoring spice ingredient with a mixture of said fat and said flavoring ingredient.

5. A solid powdery seasoning composition comprising spice-seasoning extracts and a solid carrier comprising finely divided porous absorptive protein of the animal body, said protein being the protein of animal body which is associated with fatty parts of the body, said carrier having from 0 to 3% of animal fat, the extracts being both absorbed by the carrier and occluded in depositories of pore-like and channel-like form in the particles of the carrier.

6. A solid powdery seasoning composition comprising spice-seasoning extracts and a solid carrier comprising finely divided porous animal cracklings having from 0 to 3% of animal fat, the extracts being both absorbed by the carrier and occluded in depositories of pore-like and channel-like form in the particles of the carrier.

7. A solid powdery seasoning composition comprising spice-seasoning extracts and a solid carrier comprising finely divided porous animal cracklings having from 1½ to 3% of animal body fat, the extracts being both absorbed by the carrier and occluded in depositories of pore-like and channel-like form in the particles of the carrier.

CARROLL L. GRIFFITH.